(12) United States Patent
Xu et al.

(10) Patent No.: US 10,386,958 B2
(45) Date of Patent: Aug. 20, 2019

(54) SUBSTRATE, DISPLAY DEVICE AND DRIVING METHOD THEREOF, AND TOUCH CONTROL DISPLAY SYSTEM

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jiawei Xu, Beijing (CN); Lei Zhang, Beijing (CN); Tsung Chieh Kuo, Beijing (CN); Baoran Li, Beijing (CN); Qingpu Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/821,356

(22) Filed: Nov. 22, 2017

(65) Prior Publication Data
US 2018/0300007 A1   Oct. 18, 2018

(30) Foreign Application Priority Data
Apr. 13, 2017   (CN) .......................... 2017 1 0243771

(51) Int. Cl.
*G06F 3/041*   (2006.01)
*G06F 3/0354*   (2013.01)
(Continued)

(52) U.S. Cl.
CPC ........ *G06F 3/0416* (2013.01); *G06F 3/03542* (2013.01); *G06F 3/042* (2013.01);
(Continued)

(58) Field of Classification Search
CPC ...... G06F 3/0416; G06F 3/042; G06F 3/0412; G06F 3/044; G06F 3/03542; G06F 2203/04106; G06F 2203/04112
See application file for complete search history.

(56) References Cited

U.S. PATENT DOCUMENTS 6,611,258 B1 *   8/2003   Tanaka .................. G06F 3/0433
                                                                    345/173
2006/0176266 A1 *   8/2006   Pak ...................... G02F 1/13338
                                                                    345/104
(Continued)

*Primary Examiner* — Aneeta Yodichkas
(74) *Attorney, Agent, or Firm* — McDermott Will & Emery LLP

(57) ABSTRACT

A display device includes a substrate. The substrate includes a substratum. The substratum includes a main touch control area which includes a plurality of first touch control electrodes and a plurality of second touch control electrodes that are insulated from each other and intersect with each other. A first dummy electrode is disposed between the adjacent first touch control electrodes, and is electrically connected to the first touch control electrodes which are adjacent to the first dummy electrode. A second dummy electrode is disposed between the adjacent second touch control electrodes, and is electrically connected to the second touch control electrodes which are adjacent to the second dummy electrode. The material of the first dummy electrode and the second dummy electrode is photosensitive resistive material that is sensitive to light of a specific wavelength band, and both the first dummy electrode and the second dummy electrode are transparent.

12 Claims, 5 Drawing Sheets

(51) Int. Cl.
*G06F 3/044* (2006.01)
*G06F 3/042* (2006.01)

(52) U.S. Cl.
CPC ............ *G06F 3/044* (2013.01); *G06F 3/0412* (2013.01); *G06F 2203/04103* (2013.01); *G06F 2203/04106* (2013.01); *G06F 2203/04107* (2013.01); *G06F 2203/04112* (2013.01)

(56) References Cited

U.S. PATENT DOCUMENTS

| | | | | |
|---|---|---|---|---|
| 2013/0082944 A1* | 4/2013 | Juan | ............... | G06F 3/0412 345/173 |
| 2015/0153779 A1* | 6/2015 | Ko | ............... | G06F 1/1652 345/173 |
| 2016/0132153 A1* | 5/2016 | Lin | ............... | G06F 3/044 345/174 |
| 2017/0003593 A1* | 1/2017 | Yoshinari | ............... | G03F 7/038 |

* cited by examiner

A-A'

US 10,386,958 B2

SUBSTRATE, DISPLAY DEVICE AND DRIVING METHOD THEREOF, AND TOUCH CONTROL DISPLAY SYSTEM

CROSS-REFERENCE TO RELATED APPLICATION

This application claims priority to Chinese Patent Application No. 201710243771.7, filed on Apr. 13, 2017, titled "SUBSTRATE, DISPLAY DEVICE AND DRIVING METHOD THEREOF, TOUCH DISPLAY SYSTEM", which is incorporated herein by reference in its entirety.

TECHNICAL FIELD

The present disclosure relates to the technical field of touch control, more particularly, to a substrate, a display device and a driving method thereof, and a touch control display system.

BACKGROUND

Nowadays, small-size touch screens have been widely used in electronic products such as smart phones, tablet PCs, TVs and so on. The small-size touch control screens are generally based on touch-type touch control. For example, the touch-type touch control is performed between a screen and either a finger or a pen, thus can achieve the recognition of the touch position.

With the popularity of large-size display screens, especially for business, teaching and other fields, the demand of large-size display screens is large. However, due to the size of the display screen, the application of the touch-type touch control on the large-size display screen will bring great inconvenience to the user. So, the application of integrating the touch-control function in the large-size display screens is greatly restricted.

SUMMARY

According to a first aspect, an embodiment of the present disclosure provides a substrate, which includes a substratum including a main touch control area. The main touch control area is provided with a touch control structure. The touch control structure includes a plurality of first touch control electrodes and a plurality of second touch control electrodes that are insulated from each other and intersect with each other. A first dummy electrode is further disposed between the adjacent first touch control electrodes of the plurality of first touch control electrodes, and the first dummy electrode is electrically connected to the first touch control electrodes of the plurality of first touch control electrodes which are adjacent to the first dummy electrode. A second dummy electrode is further disposed between the adjacent second touch control electrodes of the plurality of second touch control electrodes, and the second dummy electrode is electrically connected to the second touch control electrodes of the plurality of second touch control electrodes which are adjacent to the second dummy electrode. The material of the first dummy electrode and the second dummy electrode is photosensitive resistive material that is sensitive to light of a specific wavelength band, and both the first dummy electrode and the second dummy electrode are transparent.

Optionally, each of the plurality of first touch control electrodes and each of the plurality of second touch control electrodes are of a grid structure, and both the material of the plurality of first touch control electrodes and the a plurality of second touch control electrodes are metal material.

Further optionally, both the first dummy electrode and the second dummy electrode are of a grid structure.

Optionally, both the material of the first dummy electrode and the second dummy electrode are photosensitive resistive material that is sensitive to visible light or infrared light.

Optionally, the substratum further includes a wiring area. The wiring area is provided with a light-shielding layer, a plurality of first wires and a plurality of second wires located at a side of the light-shielding layer away from the substratum. Each of the plurality of first touch control electrodes is electrically connected to one or more first wires of the plurality of first wires, and each of the plurality of second touch control electrodes is electrically connected to one or more second wires of the second wires.

Further optionally, the plurality of first wires and the plurality of first touch control electrodes are formed in synchronization, and both the material of the plurality of first wires and the plurality of first touch control electrodes are metal material. The plurality of second wires and the plurality of second touch control electrodes are formed in synchronization, and both the material of the plurality of second wires and the plurality of second touch control electrodes are metal material.

Further optionally, the wiring area is further provided with a first ground wire and a second ground wire. The first ground wire is formed in synchronization with the plurality of first wires, and the second ground wire is formed in synchronization with the plurality of second wires. The first ground wire is disposed at the periphery of the plurality of first touch control electrodes, and the second ground wire is disposed at the periphery of the plurality of second touch control electrodes.

Optionally, on the basis that the light-shielding layer is disposed on the wiring area, the substrate further includes a first OC layer and a second OC layer disposed on the main touch control area and the wiring area, wherein the first OC layer is disposed between the plurality of first touch control electrodes and the plurality of second touch control electrodes, and also between the first dummy electrode and the second dummy electrode. The second OC layer is disposed on a side of the touch structure away from the substratum, a side of the plurality of first wires away from the substratum and a side of the plurality of second wires away from the substratum.

According to a second aspect, an embodiment of the present disclosure provides a display device including the substrate described in the first aspect.

According to a third aspect, an embodiment of the present disclosure provides a touch control display system, including the display device described in the second aspect, and further including a laser pen. The laser pen is configured to emit light of a specific wavelength band with certain intensity when the laser pen is turned on, so that when the light emitted by the laser pen is incident on the display device, the first dummy electrode and the second dummy electrode located at a position of the display device on which the light is incident transform into conductors.

According to a fourth aspect, an embodiment of the present disclosure provides a driving method of the display device according to the second aspect, including a touch control stage. In a touch-type capacitive touch control mode during the touch control stage, driving signals are applied to the plurality of first touch control electrodes row by row, and the plurality of second touch control electrodes receive touch control sensing signals. The touch control position is determined according to the changes of the touch control sensing signals of the plurality of second touch control electrodes, and the plurality of first touch control electrodes to which the driving signals are applied. In a remote touch control mode during the touch control stage, the plurality of first touch control electrodes and the plurality of second touch control electrodes receive touch control sensing signals. A touch control position is determined according to the changes of the touch control sensing signals between the adjacent first touch control electrodes of the plurality of first touch control electrodes and the changes of signals between the adjacent second touch control electrodes of the plurality of second touch control electrodes.

Optionally, the driving method further includes displaying a mode selection interface for user to select from, and the mode selection interface includes two options: touch-type capacitive touch control mode and remote touch control mode.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description are merely some embodiments of the present disclosure. For those skilled in the art, other drawings may be obtained based on these drawings without any creative work.

DETAILED DESCRIPTION

The technical solutions in the embodiments of the present disclosure will be described clearly and completely with reference to the accompanying drawings in the embodiments of the present disclosure. Apparently, the described embodiments are merely a part but not all of the embodiments of the present disclosure. All other embodiments obtained by persons of ordinary skill in the art based on the embodiments of the present disclosure without creative efforts shall fall within the protection scope of the present disclosure.

Figure 1:
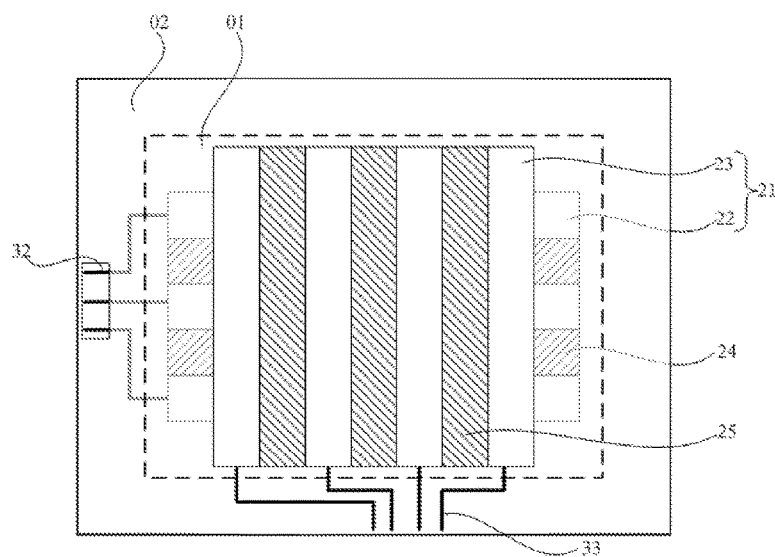
FIG. 1 is a first schematic top view of the substrate provided by the embodiments of the present disclosure.
Figure 2:
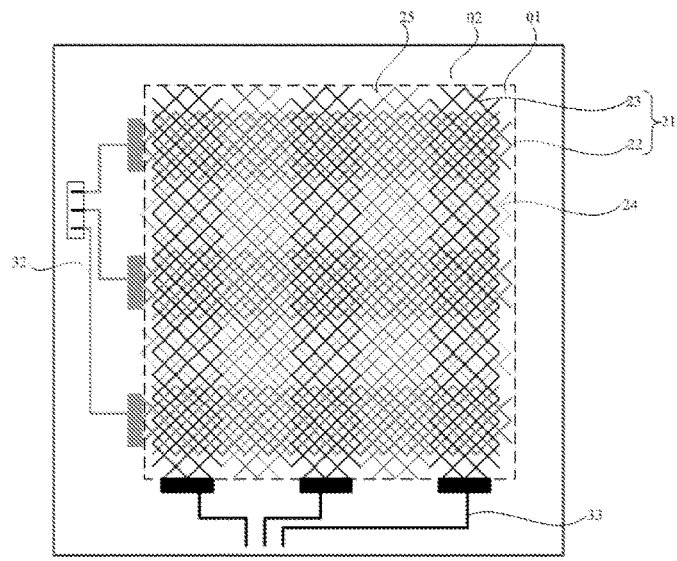
FIG. 2 is a second schematic top view of the substrate provided by the embodiments of the present disclosure.

In order to make the use of the touch control function of a large-size display device not limited by the size, an embodiment of the present disclosure provide a substrate, as shown in FIG. 1 and FIG. 2, including a substratum including a main touch control area 01. The main touch control area 01 is provided with a touch control structure 21. The touch structure 21 includes a plurality of first touch control electrodes 22 and a plurality of second touch control electrodes 23 that are insulated from each other and intersect with each other. A first dummy electrode 24 is further disposed between adjacent first touch control electrodes of the plurality of first touch control electrodes 22. The first dummy electrode 24 is electrically connected to the first touch control electrodes of the plurality of first touch control electrodes 22 which are adjacent to the first dummy electrode 24. A second dummy electrode 25 is further disposed between the adjacent second touch electrodes of the plurality of second touch electrodes 23. The second dummy electrode 25 is electrically connected to the second touch control electrodes of the plurality of second touch control electrodes 23 which are adjacent to the second dummy electrode 25.

In one embodiment, the material of the first dummy electrode 24 and the second dummy electrode 25 is photosensitive resistive material that is sensitive to light of a specific wavelength band, and both the first dummy electrode 24 and the second dummy electrode 25 are transparent.

Due to the characteristics of the photosensitive resistive material, the first dummy electrode 24 and the second dummy electrode 25 have an internal photoelectric effect. That is, when the incident light of a specific wavelength band is incident on the first dummy electrode 24 and the second dummy electrode 25, due to the material of the first dummy electrode 24 and the second dummy electrode 25, the bound electrons of the first dummy electrode 24 and the dummy electrode 25 will become excited, so that the conductive properties of the first dummy electrode 24 and the second dummy electrode 25 will change. The stronger the light is, the more electrons will become excited and the lower the resistance will be. When the resistance decreases to a certain degree, the first dummy electrode 24 and the second dummy electrode 25 will transform from impedance insulators to conductors.

After the incident light disappears, the electron-hole pairs generated due to photon excitation will recombine, and the resistance of the photosensitive resistive material will also be restored to the original value, so that the first dummy electrode 24 and the second dummy electrode 25 will resume to impedance insulators.

Based on this, in the embodiments of the present disclosure, the working principles of the plurality of first touch control electrodes 22, the plurality of second touch control electrodes 23, the first dummy electrode 24 and the second dummy electrode 25 in the main touch area 01 are as follows.

When the touch control is performed based on the touch-type mode of the finger or the capacitance pen (that is, based on a touch-type capacitive touch control mode), the first dummy electrode 24 and the second dummy electrode 25 are impedance insulators. Therefore, the recognition of the touch control position can be realized by detecting the change of the capacitance between the plurality of first touch control electrodes 22 and the plurality of second touch control electrodes 23. In this process, because there is no light of specific wavelength band and certain intensity which is incident to the main touch control area 20, the first dummy electrode 24 and the second dummy electrode 25 are in an insulated high-impedance state and do not affect the capacitive touch control.

When the touch control is performed based on a lighting mode of a specific band (that is, based on a remote touch control mode), light of a certain intensity causes the first dummy electrode 24 and the second dummy electrode 25 at a position on which the light is incident to respond, that is, the first dummy electrode 24 and the second dummy electrode 25 transform from the impedance insulators to conductors. Therefore, at the position on which the light is incident, the first touch control electrodes of the plurality of first touch control electrodes 22 which are adjacent to the first dummy electrode 24 are electrically connected, and the second touch control electrodes of the plurality of second touch control electrode 23 which are adjacent to the second dummy electrode 25 are electrically connected. Based on this, it is able to achieve the recognition of the touch control position by detecting the changes of signals of voltage and resistance between the adjacent first touch control electrodes of the plurality of first touch control electrodes 22 and between the adjacent second touch control electrodes of the plurality of second touch electrodes 23. In one embodiment, there is one first dummy electrode 24 configured to turn on the first touch control electrodes of the plurality of first touch electrodes 22 which are adjacent to the first dummy electrode 24. When positions of the first dummy electrode 24 on which light is incident are different, the values of the changes of signals such as voltage and resistance and so on between the first touch control electrodes of the plurality of first touch electrodes 22 which are adjacent to the first dummy electrodes 24 are not equal.

Several matters should be noted as follows.

First, the touch control structure 21 is not limited as long as the recognition of the touch control position can be achieved based on the mutual capacitance manner. The touch control structure 21 showed in FIG. 1 and FIG. 2 is merely illustrative.

In an embodiment, there is a film layer having an insulating effect provided between the plurality of first touch control electrodes 22 and the plurality of second touch control electrodes 23 to isolate them, and between the first dummy electrode 24 and the second dummy electrode 25 to isolate them.

Second, the substratum includes not only the main touch control area 01 but also a wiring area 02. The main touch control area 01 is an area used for screen display when the substrate is applied to a display device. The wiring area 02 is located at the periphery of the main touch control area 01.

The wiring area 02 is provided with a plurality of first wires 32 and a plurality of second wires 33. Each of the plurality of first touch control electrodes 22 is electrically connected to one or more first wires of the plurality of first wires 32. Each of the plurality of second touch control electrodes 23 is electrically connected to one or more second wires of the plurality of second wires 33. In one embodiment, any one of the plurality of first touch control electrodes 22 is electrically connected with at least one first wire of the plurality of first wires 32. One first wire of the plurality of first wires 32 which is electrically connected to any one of the first touch control electrodes 22 is insulated to other first wire(s) of the plurality of first wires 32 which is/are electrically connected to other first touch control electrode(s) of the first touch control electrodes 22. In one embodiment, any one of the plurality of second touch control electrodes 23 is electrically connected with at least one second wire of the plurality of second wires 33. One second wire of the plurality of second wires 33 which is electrically connected to any one of the second touch control electrodes 23 is insulated to other second wire(s) of the plurality of first second 33 which is/are electrically connected to other second touch control electrode(s) of the second touch control electrodes 23.

Thirdly, if the material of the first dummy electrode 24 is sensitive to the light of a specific wavelength band, the material of the second dummy electrode 25 should also be sensitive to the light of that specific wavelength band.

In an embodiment, the material of first dummy electrode 24 and the second dummy electrode 25 can be selected to be the same.

The embodiment of the present disclosure provides a substrate. By providing the touch control structure 21 including the plurality of first touch control electrodes 22 and the plurality of second touch control electrodes 23 in the main touch area 01, it is able to achieve the recognition of the touch control position based on the touch-type capacitive touch control mode. Based on this, by disposing the first dummy electrode 24 between the adjacent first touch control electrodes of the plurality of first touch control electrodes 22, disposing the second dummy electrode 25 between the adjacent second touch control electrodes of the plurality of second touch control electrodes 23, and making the material of both the first dummy electrode 24 and the second dummy electrode 25 photosensitive resistive material, it is able to achieve the recognition of the touch control position due to the internal photoelectric effect of the photosensitive resistive material in the touch-type capacitive touch control mode. Based on this, when the substrate is applied to a display device, the touch control function can be implemented in both touch control modes, so that the user experience can be improved and the structure is simple. Especially when the substrate is applied to a large-size display device, the use of the touch control function of the large-size display device can be not limited by the size. Since the first dummy electrode 24 and the second dummy electrode 25 can be made to only respond to the light of a specific wavelength band and a certain intensity (that is, when light intensity is greater than or equal to the certain intensity, the resistance of the first dummy electrode 24 and the second dummy electrode 25 decreases sharply) by controlling the composition of the photosensitive resistive material and the film formation process of forming the first dummy electrode 24 and the second dummy electrode 25. Therefore, when the display device with the substrate is in use, even there is ambient light, sunlight and other light, the first dummy electrode 24 and the second dummy electrode 25 will not respond to them, because the light intensity of the light of specific wavelength band among these light is small. Thus, the two touch control modes will not be affected by ambient light, sunlight and other light.

Figure 3:
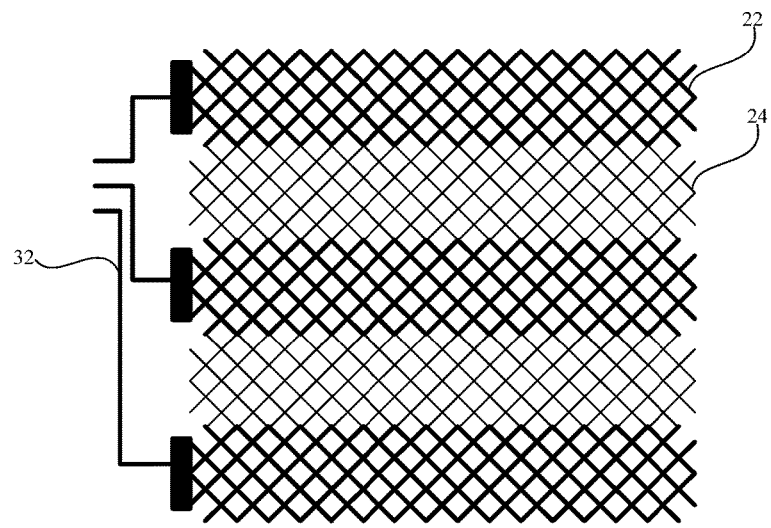
FIG. 3 is a schematic top view of the plurality of first touch control electrodes and the first dummy electrode provided by the embodiments of the present disclosure.
Figure 4:
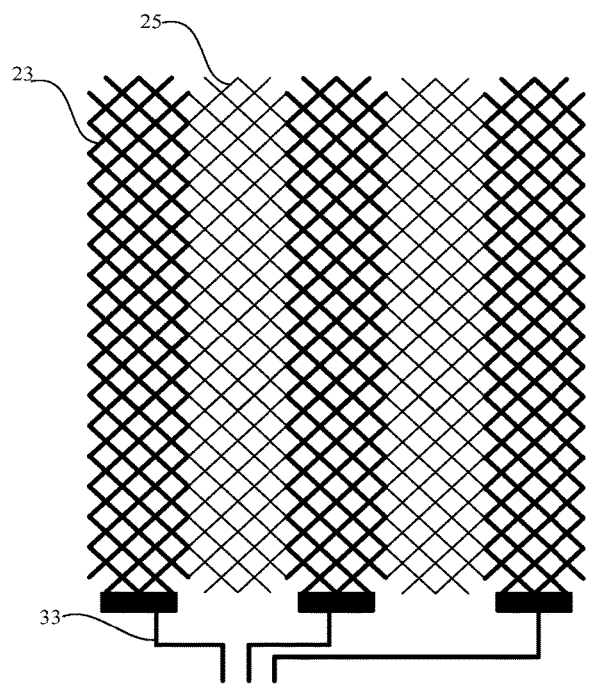
FIG. 4 is a schematic top view of the plurality of second touch control electrodes and the second dummy electrode provided by the embodiments of the present disclosure.

Optionally, as shown in FIG. 2~FIG. 4, each of the plurality of first touch control electrodes 22 and each of the plurality of second touch control electrodes 23 are of a grid structure, and both the material of a plurality of first touch control electrodes 22 and the plurality of second touch control electrodes 23 are metal material.

Here, the shape of the grid in the grid structure is a regular polygon or an irregular polygon. As shown in FIG. 3, taking one first touch control electrode of the plurality of first touch control electrodes 22 as an example, a plurality of metal lines are intersected to form a plurality of grids. For any grid, the shape may be a regular polygon or an irregular polygon. In one embodiment, the shape of the grid may be a rhombus as shown in FIG. 3. Of course, the shape of the grid may be other shapes, such as rectangle.

It should be noted that, first, the metal material can be a metal element, an alloy, and so on.

Second, for a substrate applied to a display device of any size, before fabricating the plurality of first touch control electrodes 22 of grid structures and the plurality of second touch control electrodes 23 of grid structures, an optical simulation should be performed by a relevant software, such that the parameters of the grids of the plurality of first control touch electrodes 22 and the plurality of second touch control electrodes 23 are matched with the display panel. For example, for a rhombus grid, appropriate side lengths and included angles of a rhombus should be determined by simulation to avoid the problem of interference fringes which easily occurs after the substrate is applied to a display device due to mismatch.

In the embodiments of the present disclosure, since the metal grid structure is transparent and the sheet resistance of the metal material is low, the RC (resistance-capacitance) delay can be reduced. Therefore, when the substrate is applied to a large-size display device, it can also be driven by an IC (Integrated Circuit), achieving a better touch control effect and supporting multi-touch control. In addition, the plurality of first touch control electrodes 22 and the plurality of second touch control electrodes 23 of the metal material can prevent ESD (electrostatic discharge).

Further optionally, the sheet resistance of the metal material is smaller than or equal to 0.3 Ω/cm².

Exemplarily, the metal material can be Ag (silver), Cu (copper), Al (aluminum), AlNb alloy (aluminum niobium alloy) and so on.

By making a plurality of first touch control electrodes 22 and a plurality of second touch control electrodes 23 using a metal material with particularly good electrical conductivity, an excellent touch control effect can be achieved and a maximum of countless touch control points can be supported.

On the basis of the structure of each of the plurality of first touch control electrodes 22 and each of the plurality of second touch control electrodes 23 being of a grid structure, as shown in FIG. 2~FIG. 4, the first dummy electrodes 24 and the second dummy electrodes 25 are of a grid structure.

It should be noted that, when each of the plurality of first touch control electrodes 22, each of the plurality of second touch control electrodes 23, the first dummy electrode 24 and the second dummy electrode 25 are all of a grid structure, it is necessary to perform an optically simulation by using the relevant software according to the size of the substrate. Thus, the parameters of the grids of the first dummy electrode 24 and the second dummy electrode 25 will be matched with the parameters of the grids of the plurality of first touch control electrodes 22 and the plurality of second touch control electrodes 23, and the parameters of the grids of the plurality of first touch control electrodes 22, the plurality of second touch control electrodes 23, the first dummy electrodes 24, the second dummy electrodes 25 will be matched with the display panel as well.

Second, in FIG. 2~FIG. 4, the plurality of first touch control electrodes 22 and the plurality of second touch control electrodes 23 are indicated by bold lines in order to distinguish between the plurality of first touch control electrodes 22 and the first dummy electrode 24, and between the plurality of second touch control electrodes 23 and the second dummy electrode 25.

In the situation of fabricating the plurality of first touch control electrodes 22 and the plurality of second touch control electrodes 23 into a grid structure, and fabricating the first dummy electrodes 24 and the second dummy electrodes 25 into a non-grid structure, the grid structure and non-grid structure will be prone to produce visual difference, which cause a problem in elimination of shadow. Compared with that, in the embodiment of the present disclosure, the first dummy electrode 24 and the second dummy electrode 25 are also fabricated into a grid structure, which can act as a shadow eliminating effect so as to achieve a good optical effect.

Based on the above, the material of the first dummy electrode 24 and the second dummy electrode 25 can be photosensitive resistive material that is sensitive to visible light, infrared light, or ultraviolet light and so on.

Considering that ultraviolet light is harmful to the human body, the material of the first dummy electrode 24 and the second dummy electrode 25 can be photosensitive resistive material that is sensitive to visible light or infrared light optionally.

In one embodiment, when the material of the first dummy electrode 24 and the second dummy electrode 25 is photosensitive resistive material that is sensitive to visible light, by controlling the composition of the material and the film formation process of forming the first dummy electrode 24 and the second dummy electrode 25, it is able to make the first dummy electrode 24 and the second dummy electrode 25 respond to a visible light of certain intensity, preventing the first dummy electrode 24 and the second dummy electrode 25 from responding to the visible light of the ambient light.

When the material of the first dummy electrode 24 and the second dummy electrode 25 is photosensitive resistive material that is sensitive to infrared light, by controlling the composition of the material and the film formation process of forming the first dummy electrode 24 and the second dummy electrode 25, it is able to make the first dummy electrode 24 and the second dummy electrode 25 respond to a infrared light of certain intensity, preventing the first dummy electrode 24 and the second dummy electrode 25 from responding to the infrared of the ambient light.

Examplarily, the photosensitive resistive material that is sensitive to visible light may include at least one of CdS (cadmium sulfide), CdSe (cadmium selenide) and so on. The photosensitive resistive material that is sensitive to infrared light may include at least one of PbS (lead sulfide), PbSe (lead selenide) and so on.

Figure 5:
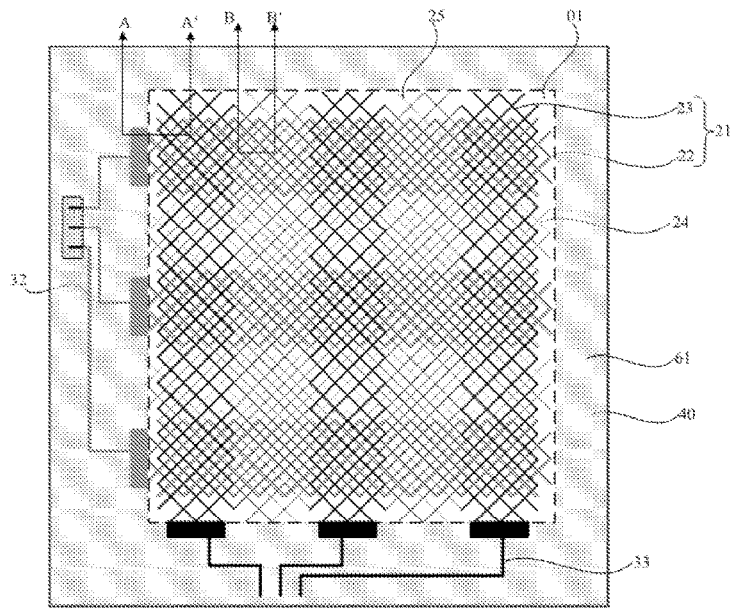
FIG. 5 is a third schematic top view of the substrate provided by the embodiments of the present disclosure.

Based on the above, as shown in FIG. 5, the wiring area 02 is provided with a light-shielding layer 40, a plurality of first wires 32 and a plurality of second wires 33, wherein, a plurality of first wires 32 and a plurality of second wires 33 are disposed on a side of the light-shielding layer 40 away from the substratum.

That is, in this case, the substrate is a touch control cover, which may be disposed on the light-emitting side of the display panel. In this way, when the substrate is applied to a display device, the substratum of the substrate can also serve as a display panel.

In one embodiment, the light-shielding layer 40 can be a white light-shielding layer or a black light-shielding layer. The substratum can be a glass substrate.

Further optionally, as shown in FIG. 3, the plurality of first wires 32 and the plurality of first touch control electrodes 22 are formed in synchronization, and both the material of the plurality of first wires 32 and the plurality of first touch control electrodes 22 are metal material. That is, the plurality of first wires 32 and the plurality of first touch control electrodes 22 are formed by one and the same forming process, so as to reduce the number of patterning processes.

As shown in FIG. 4, the plurality of second wires 33 and the plurality of second touch control electrodes 23 are formed in synchronization, and both the material of the plurality of second wires 33 and the plurality of second touch control electrodes 23 are metal material. That is, the plurality of second wires 33 and the plurality of second touch control electrodes 23 are formed by one and the same forming process, so as to reduce the number of patterning processes.

Figure 6:
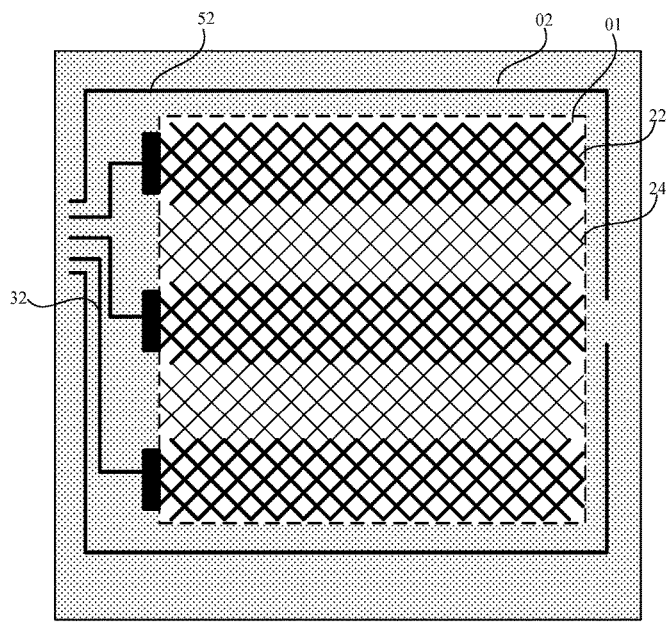
FIG. 6 is a schematic top view of the plurality of first touch control electrodes, the first dummy electrode, the plurality of first wires, and the first ground wire provided by the embodiments of the present disclosure.
Figure 7:
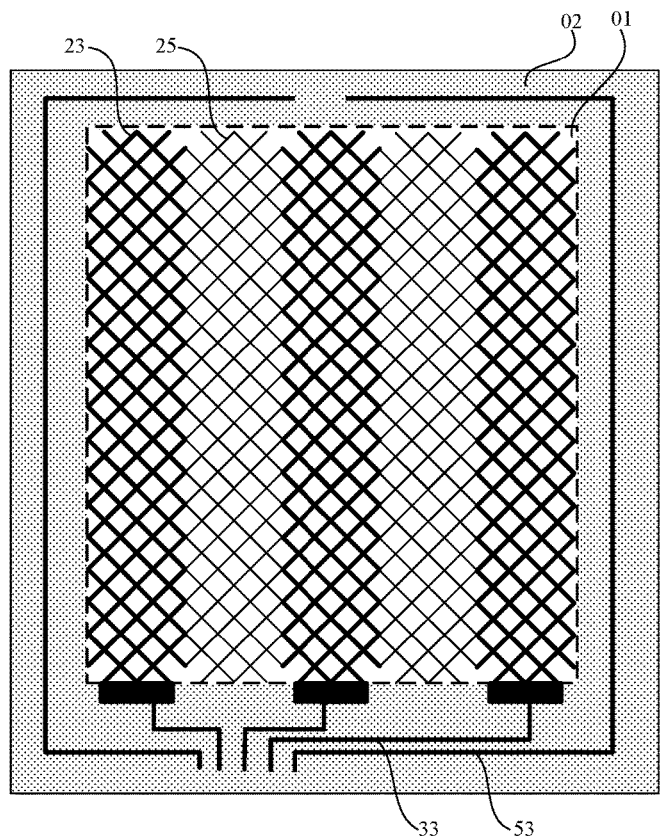
FIG. 7 is a schematic top view of the plurality of second touch control electrodes, the second dummy electrode, the plurality of second wires, and the second ground wire provided by the embodiments of the present disclosure.

Further optionally, as shown in FIG. 6 and FIG. 7, the wiring area 02 is further provided with a first ground wire 52 and a second ground wire 53, wherein the first ground wire 52 is formed in synchronization with the plurality of first wires 32, and the second ground wire 53 is formed in synchronization with the plurality of second wires 33. The first ground wire 52 is disposed at the periphery of the plurality of first touch control electrodes 22, and the second ground wire 53 is disposed at the periphery of the plurality of second touch control electrodes 23.

It should be noted that, if the first ground wire 52 is disposed at the periphery of the plurality of first touch control electrodes 22 and the first ground wire 52 is closed, the area of the internal circuit of the first ground wire 52 will be too large, which has a strong absorption of external signals, and the current in the closed loop magnetic flux changes, will have interference on the touch control. Therefore, when the first ground wire 52 is designed, the first ground wire 52 should not be closed. For example, as shown in FIG. 6, the first ground wire 52 may be disconnected at a certain position.

Similarly, for the second ground wire 53, the second ground wire 53 should not be closed too. For example, as shown in FIG. 7, the second ground wire 53 may be disconnected at a certain position.

In the embodiment of the present disclosure, the first ground wire 52 and the second ground wire 53 may have the effect of shielding signals, thus preventing the signals of the plurality of first touch electrodes 22 and the plurality of second touch electrodes 23 from being interfered by external signals, and making the recognition of the touch control location more accurate.

Figure 8:
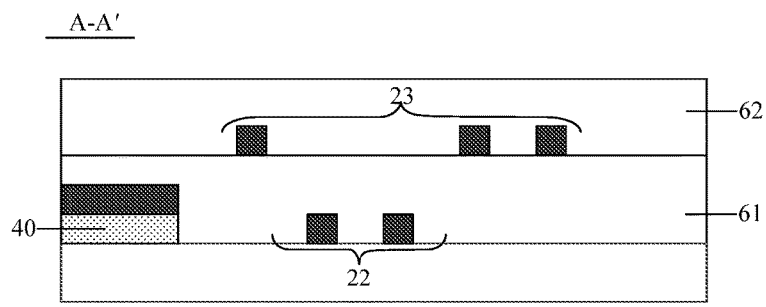
FIG. 8 is a cross-sectional view taken along line AA' of FIG. 5.
Figure 9:
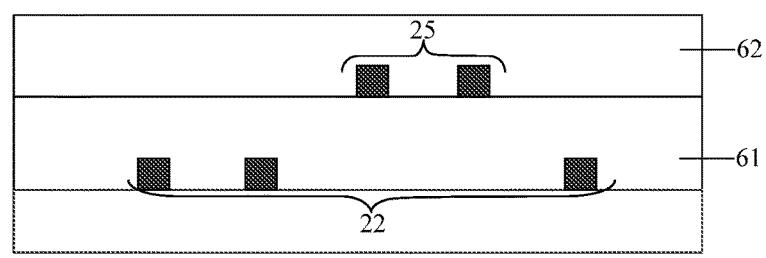
FIG. 9 is a cross-sectional view taken along line BB' of FIG. 5.

Optionally, as shown in FIG. 5, FIG. 8 and FIG. 9, the substrate further includes a first OC (Over Coating) layer 61 and a second OC layer 62 disposed on the main touch control area 01 and the wiring area 02. The first OC layer 61 is disposed between the plurality of first touch control electrodes 22 and the plurality of second touch control electrodes 23 and also between the first dummy electrode 24 and the second dummy electrode 25. The second OC layer 62 is disposed on a side of the touch control structure 21 away from the substratum, a side of the plurality of first wires 32 away from the substratum and a side of the plurality of second wires 33 away from the substratum.

Apparently, the plurality of first touch control electrodes 22 and the second dummy electrode 25 are also separated by the first OC layer 61, and the plurality of second touch control electrodes 23 and the first dummy electrode 24 are also separated by the first OC layer 61.

It should be noted that, when the first OC layer 61 covers the plurality of first wires 32, the plurality of first wires 32 may be exposed in the bonding region optionally.

In the embodiments of the present disclosure, the first OC layer 61 is provided to prevent the short circuit between the plurality of first touch control electrodes 22 and the plurality of second touch control electrodes 23. The second OC layer 62 can block water and oxygen to protect the touch control structure 21, a plurality of first wires 32 and a plurality of second wires 33. Based on this, the material of the first OC layer 61 and the second OC layer 62 are same, and the same process can be used to simplify the formation process.

The embodiments of the present disclosure further provide a display device, which includes the above substrate.

Optionally, the substrate is a touch control cover, which is disposed on the light-emitting side of the display panel. Based on this, the display panel may be a liquid crystal display panel or an OLED (Organic Light Emitting Diode) display panel. In an embodiment, the display panel and the substrate may be connected by an OCR (Optical Clear Resin) 60.

It should be noted that, because the display device of the present disclosure has two touch control modes, switching buttons can be provided on the display device or a selection interface can be provided in a display mode, so that users can select a desired touch control mode in the above ways. Specifically, the ways for users to choose between the touch control modes can be set according to the actual situations.

The display device provided by the embodiments of the present disclosure has the same technical effect as the substrate, and details are not described herein again.

The embodiments of the present disclosure further provide a touch control display system including the above display device, and further including a laser pen. The laser pen is configured to emit light of a specific wavelength band with certain intensity when the laser pen is turned on, so that when the light emitted by the laser pen is incident on the display device, the first dummy electrode 24 and the second dummy electrode 25 located at the position of the display device on which the light is incident transform to conductors.

That is, in the remote touch control mode, by only turning on the laser pen to make the laser light of a certain intensity irradiated from the laser pen incident on the corresponding position of the display device, it is able to achieve the recognition of the touch control position by detecting the changes of signals such as voltage and resistance between adjacent first touch control electrodes of the plurality of first touch control electrodes 22 and between adjacent second touch control electrodes of the plurality of second touch control electrodes 23 due to the internal photoelectric effect of the first dummy electrode 24 and the second dummy electrode 25.

It should be noted that, the wavelength band and the intensity of the light emitted by the laser pen need to be determined according to the material of the first dummy electrode 24 and the second dummy electrode 25, so that the first dummy electrode 24 and the second dummy electrode 25 at the position on which the light is incident will respond to the light emitted by the laser pen, but not respond to the light of this wavelength band in the environment.

The embodiments of the present disclosure further provide a driving method of the above display device. The driving method includes: a touch stage. The touch stage includes a touch-type capacitive touch control mode and a remote touch control mode.

In the touch-type capacitive touch control mode, driving signals are applied to a plurality of first touch control electrodes 22 row by row, and a plurality of second touch control electrodes 23 receive a touch control sensing signal. The touch control position is determined according to the plurality of first touch control electrodes 22 that driving signals are applied to and the changes of the signals of the plurality of second touch control electrodes 23.

In the remote touch control mode, the plurality of first touch control electrodes 22 and the plurality of second touch control electrodes 23 receive touch control sensing signals. And a touch control position is determined according to the changes of touch control sensing signals between the adjacent first touch control electrodes of the plurality of first touch electrodes 22 and between the adjacent second touch control electrodes of the plurality of second touch electrodes 23.

Figure 10:
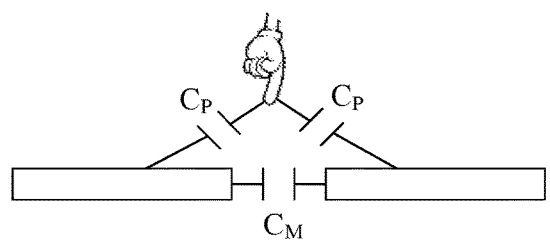
FIG. 10 is a schematic diagram of a capacitive touch control method provided by the embodiments of the present disclosure.

Specifically, in the touch-type capacitive touch control mode, as shown in FIG. 10, driving signals are applied to the plurality of first touch control electrodes 22 row by row, and based on the mutual capacitance (denoted as $C_M$) between the plurality of first touch control electrodes 22 and the plurality of second touch control electrodes 23, the plurality of second touch control electrodes 23 receive touch control sensing signals. When a finger or stylus is not in contact with the display device, the sensing signals received by all of the plurality of second touch control electrodes 23 are the same. When the finger or stylus is in contact with the display device, the finger or stylus forms a capacitance (denoted $C_P$) with the plurality of first touch control electrodes 22 and the plurality of second touch control electrodes 23. At this time, the valve of the capacitance of the touch control position is $C_P+C_M$, and the second touch control electrodes of the plurality of second touch control electrodes 23 which are located at the touch point received the changes of the touch control sensing signals to achieve the recognition of the touching position.

In the touch-type capacitive touch control mode, the first dummy electrode 24 and the second dummy electrode 25 are in an insulated high-resistance state that will not affect the capacitive touch performance.

In the remote touch control mode, the plurality of first touch control electrodes 22 and the plurality of second touch control electrodes 23 are all used for receiving touch control sensing signals. When the light emitted by the laser pen is not incident on the display device, the voltage and resistance between the adjacent first touch control electrodes of the plurality of first touch control electrodes 22 and between the adjacent second touch control electrodes of the plurality of second touch control electrodes 23 are constant. Because the first dummy electrode 24 and the second dummy electrode 25 are impedance insulators, and both the adjacent first touch control electrodes of the plurality of first touch control electrodes 22 and the adjacent second touch control electrodes of the plurality of second touch control electrodes 23 are insulated from each other. When the light of a specific wavelength band emitted by the laser pen incident on the display device with a certain intensity, the first dummy electrode 24 and the second dummy electrode 25 located at the position on which the light is incident transform to conductors from impedance insulators, and the first touch control electrodes of the plurality of first touch control electrodes 22 connected to the first dummy electrode 24 are electrically connected, and the second touch control electrodes of the plurality of second touch control electrodes 23 connected to the second dummy electrode 25 are electrically connected. Therefore, it is able to achieve the recognition of the touch control position by detecting the changes of the touch control sensing signals such as voltage and resistance and so on between the adjacent first touch control electrodes of the plurality of first touch control electrodes 22 and between the adjacent second touch control electrodes of the plurality of second touch control electrodes 23.

The embodiments of the present disclosure provide a driving method of a display device. In the touch-type capacitive touch control mode, it is able to achieve the recognition of the touch control position by applying driving signals to the plurality of first touch control electrodes 22 and using a plurality of second touch control electrodes 23 to receive touch control sensing signals. In the remote touch control mode, it is able to achieve the recognition of the touch control position by receiving touch control sensing signals through the plurality of first touch control electrodes 22 and the plurality of second touch control electrodes 23. Based on this, the display device can achieve the touch control function in both touch modes, so that the user experience can be improved and the structure is simple. Especially the touch control function of a large-size display device will not be limited by the size. Since the first dummy electrode 24 and the second dummy electrode 25 only respond to the light of a specific wavelength band and a certain intensity (that is, when light intensity is greater than or equal to the certain intensity, the resistance of the first dummy electrode 24 and the second dummy electrode 25 decreases sharply, therefore, when the display device is in use, even there is ambient light, sunlight and other light, the first dummy electrode 24 and the second dummy electrode 25 will not respond to them, because the light intensity of the light of specific wavelength band of these light is small. Thus, the two touch control modes will not be affected by ambient light, sunlight and other light.

Optionally, the driving method of the display device further includes displaying a mode selection interface for user to select from, and the mode selection interface includes two options: touch-type capacitive touch control mode and remote touch control mode.

For example, the mode selection interface may be displayed at power-on. After the user selects one of the options, the touch control position is identified according to the driving mode corresponding to the option.

The embodiments of the present disclosure enable the display device to display a mode selection interface for selecting a touch-type capacitive touch control mode or a remote touch control mode by software, and compared with the selection of two types of touch modes is performed by setting a toggle button on the hardware, the embodiments of the present disclosure can avoid major changes to the display device as a whole and reduce costs.

The above descriptions are merely specific embodiments of the present disclosure, but the protection scope of the present disclosure is not limited thereto. Anyone skilled in the art may easily conceive changes and substitutions within the technical scope disclosed in the present disclosure, the changes and substitutions should be covered by the scope of the present disclosure. Therefore, the protection scope of the present disclosure should be based on the protection scope of the claims.

What is claimed is:

1. A substrate, comprising a substratum, the substratum including a main touch control area, the main touch control area being provided with a touch control structure, wherein, the touch control structure includes a plurality of first touch control electrodes and a plurality of second touch control electrodes that are insulated from each other and intersect with each other;

a first dummy electrode is further disposed between the adjacent first touch control electrodes of the plurality of first touch control electrodes, and the first dummy electrode is electrically connected to the first touch control electrodes of the plurality of first touch control electrodes which are adjacent to the first dummy electrode; a second dummy electrode is further disposed between the adjacent second touch control electrodes of the plurality of second touch control electrodes, and the second dummy electrode is electrically connected to the second touch control electrodes of the plurality of second touch control electrodes which are adjacent to the second dummy electrode, the material of the first dummy electrode and the second dummy electrode is photosensitive resistive material that is sensitive to light of a specific wavelength band, and both the first dummy electrode and the second dummy electrode are transparent.

2. The substrate according to claim 1, wherein, each of the plurality of first touch control electrodes and each of the plurality of second touch control electrodes are of a grid structure, and both the material of the plurality of first touch control electrodes and the a plurality of second touch control electrodes are metal material.

3. The substrate according to claim 2, wherein, both the first dummy electrode and the second dummy electrode are of a grid structure.

4. The substrate according to claim 1, wherein, both the material of the first dummy electrode and the second dummy electrode are photosensitive resistive material that is sensitive to visible light or infrared light.

5. The substrate according to claim 1, wherein, the substratum further includes a wiring area; the wiring area is provided with a light-shielding layer, a plurality of first wires and a plurality of second wires located at a side of the light-shielding layer away from the substratum, wherein, each of the plurality of first touch control electrodes is electrically connected to one or more first wires of the plurality of first wires, and each of the plurality of second touch control electrodes is electrically connected to one or more second wires of the second wires.

6. The substrate according to claim 5, wherein, the plurality of first wires and the plurality of first touch control electrodes are formed in synchronization, and both the material of the plurality of first wires and the plurality of first touch control electrodes are metal material;

the plurality of second wires and the plurality of second touch control electrodes are formed in synchronization, and both the material of the plurality of second wires and the plurality of second touch control electrodes are metal material.

7. The substrate according to claim 6, wherein, the wiring area is further provided with a first ground wire and a second ground wire, wherein, the first ground wire is formed in synchronization with the plurality of first wires, and the second ground wire is formed in synchronization with the plurality of second wires;

the first ground wire is disposed at the periphery of the plurality of first touch control electrodes, and the second ground wire is disposed at the periphery of the plurality of second touch control electrodes.

8. The substrate according to claim 5, wherein, the substrate further comprises a first OC layer and a second OC layer disposed on the main touch control area and the wiring area, wherein, the first OC layer is disposed between the plurality of first touch control electrodes and the plurality of second touch control electrodes, and between the first dummy electrode and the second dummy electrode;

the second OC layer is disposed on a side of the touch structure away from the substratum, a side of the plurality of first wires away from the substratum and a side of the plurality of second wires away from the substratum.

9. A display device, comprising the substrate according to claim 1.

10. A touch control display system, comprising the display device according to claim 9, and further comprising a laser pen;

the laser pen is configured to emit light of a specific wavelength band with certain intensity when the laser pen is turned on, so that when the light emitted by the laser pen is incident on the display device, the first dummy electrode and the second dummy electrode located at a position of the display device on which the light is incident transform into conductors.

11. A driving method of the display device according to claim 9, comprising:

a touch control stage, during the touch stage, in the mode of a touch-type capacitive touch control mode, driving signals are applied to the plurality of first touch control electrodes row by row, the plurality of second touch control electrodes receive touch control sensing signals, and a touch control position is determined according to the changes of the touch control sensing signals of the plurality of second touch control electrodes and the plurality of first touch control electrodes to which the driving signals are applied;

in a remote touch control mode, the plurality of first touch control electrodes and the plurality of second touch control electrodes receive touch control sensing signals, and a touch control position is determined according to the changes of the touch control sensing signals between the adjacent first touch control electrodes of the plurality of first touch control electrodes and the changes of signals between the adjacent second touch control electrodes of the plurality of second touch control electrodes.

12. The driving method according to claim 11, wherein, the driving method further comprising displaying a mode selection interface for user to select from, and the mode selection interface includes two options: touch-type capacitive touch control mode and remote touch control mode.

* * * * *